(12) United States Patent
Cheng

(10) Patent No.: US 12,105,318 B2
(45) Date of Patent: Oct. 1, 2024

(54) DISPLAY DEVICE AND MOUNTING METHOD OF THE SAME

(71) Applicant: E Ink Holdings Inc., Hsinchu (TW)

(72) Inventor: Chao-Chun Cheng, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/507,108

(22) Filed: Nov. 13, 2023

(65) Prior Publication Data
US 2024/0184037 A1   Jun. 6, 2024

(30) Foreign Application Priority Data

Dec. 5, 2022 (TW) .................................. 111146486

(51) Int. Cl.
*F21V 8/00* (2006.01)
(52) U.S. Cl.
CPC ......... *G02B 6/0091* (2013.01); *G02B 6/0058* (2013.01); *G02B 6/0073* (2013.01)
(58) Field of Classification Search
CPC ... G02B 6/0091; G02B 6/0058; G02B 6/0073
See application file for complete search history.

(56) References Cited

U.S. PATENT DOCUMENTS

| | | | | |
|---|---|---|---|---|
| 5,917,664 A * | 6/1999 | O'Neill | ................. | G02B 5/124 |
| | | | | 359/834 |
| 6,846,098 B2 * | 1/2005 | Bourdelais | ........... | G02B 5/0242 |
| | | | | 362/330 |
| 8,602,628 B2 | 12/2013 | Mi et al. | | |
| 9,696,464 B2 * | 7/2017 | Saeki | .................... | B29C 45/372 |
| 10,698,138 B2 * | 6/2020 | Boyd | ................... | G02B 5/0284 |
| 2003/0142247 A1 * | 7/2003 | Nishiyama | ........ | G02F 1/133553 |
| | | | | 349/67 |
| 2003/0214719 A1 * | 11/2003 | Bourdelais | ........... | G02B 5/0284 |
| | | | | 349/64 |
| 2006/0098288 A1 * | 5/2006 | Pan | ....................... | G02B 6/0051 |
| | | | | 359/599 |
| 2009/0236494 A1 * | 9/2009 | Hata | ...................... | C03B 11/086 |
| | | | | 148/403 |

(Continued)

FOREIGN PATENT DOCUMENTS

| TW | M268605 U | 6/2005 |
|---|---|---|
| TW | 201531784 A | 8/2015 |

OTHER PUBLICATIONS

The office action of corresponding TW application No. 111146486 issued on Sep. 15, 2023.

*Primary Examiner* — Bryon T Gyllstrom
(74) *Attorney, Agent, or Firm* — CKC & Partners Co., LLC

(57) ABSTRACT

A display device includes a display panel, a front light module, and a cover structure. The front light module is located on the display panel. The front light module includes a light guide thin film and a light source. The light guide thin film has a thickness. The light guide thin film includes a top surface and an irregular protrusion structure located on the top surface. The irregular protrusion structure has a stripe feature direction in a plan view, and the irregular protrusion structure has a height difference. The light source is configured to emit a light beam traveling in a direction parallel with the stripe feature direction of the irregular protrusion structure. The cover structure is located on the front light module.

12 Claims, 9 Drawing Sheets

(56) References Cited

U.S. PATENT DOCUMENTS

| | | | |
|---|---|---|---|
| 2012/0064296 A1* | 3/2012 | Walker, Jr. | G02B 5/02 |
| | | | 977/773 |
| 2012/0147593 A1* | 6/2012 | Yapel | G02B 5/0221 |
| | | | 359/737 |
| 2018/0003364 A1* | 1/2018 | Wheatley | G02F 1/133504 |
| 2019/0331843 A1 | 10/2019 | Yasumoto et al. | |

* cited by examiner

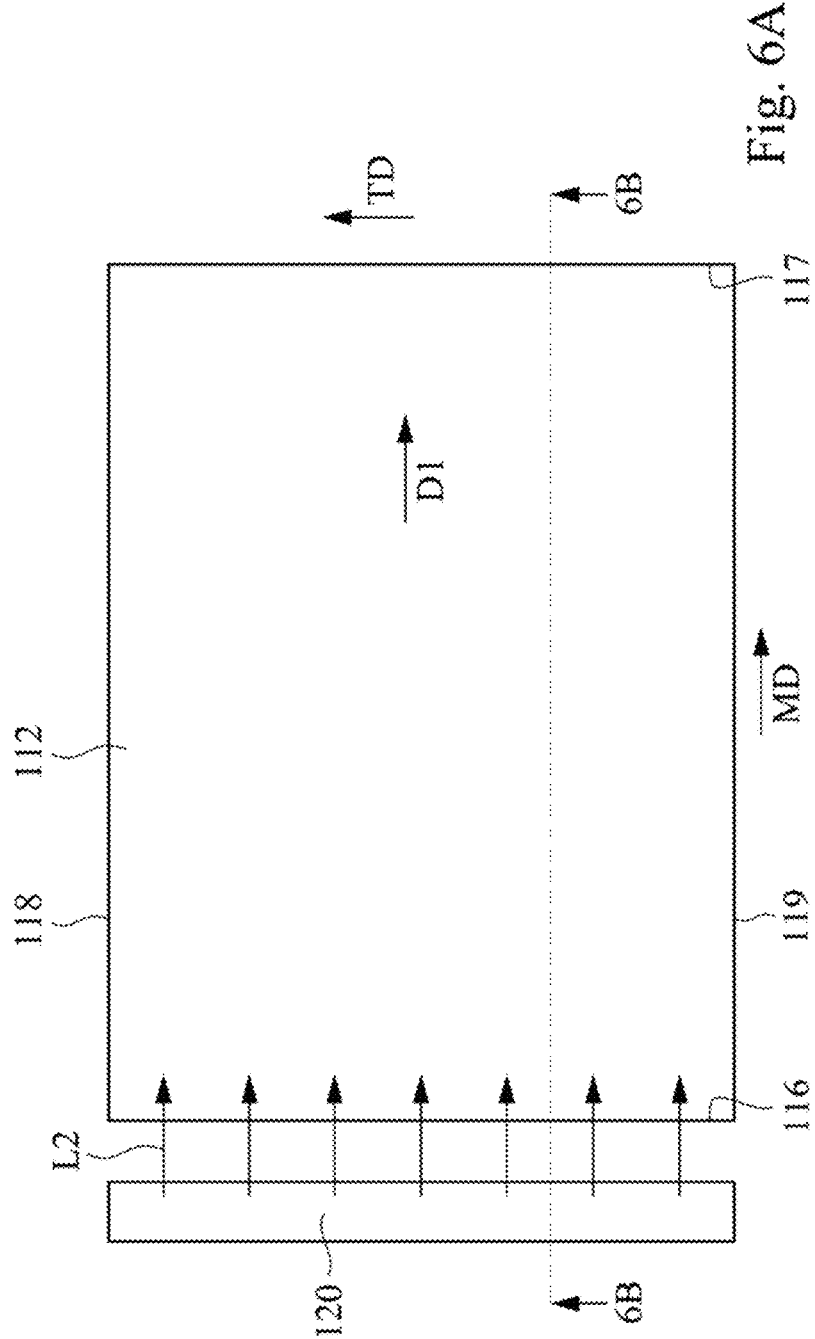
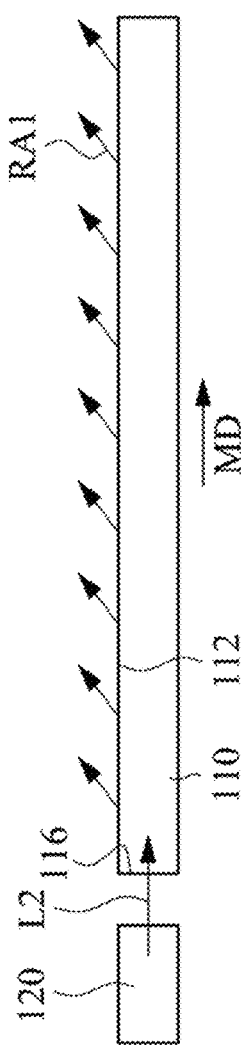

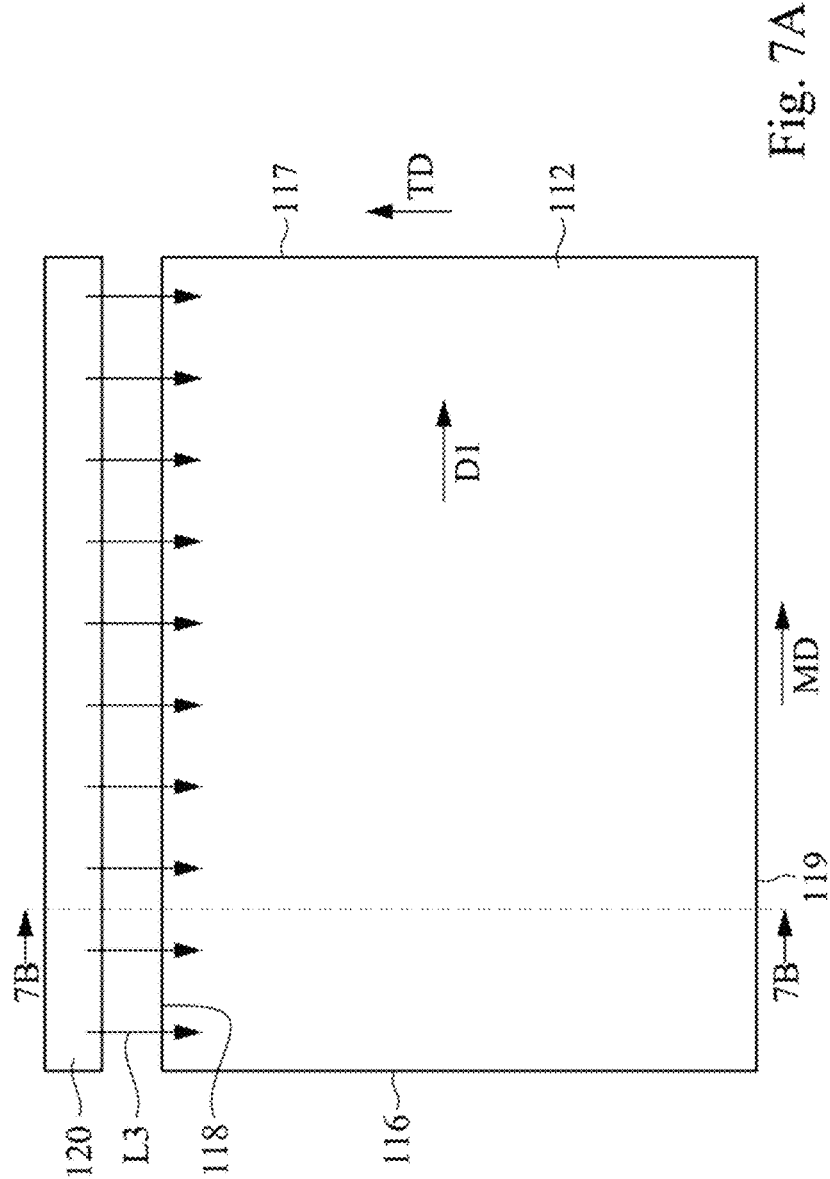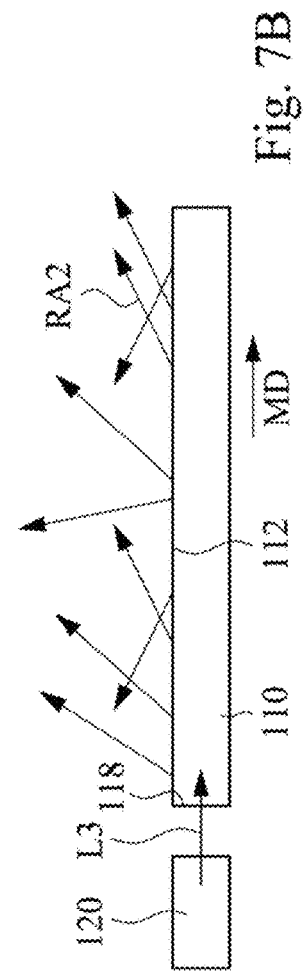

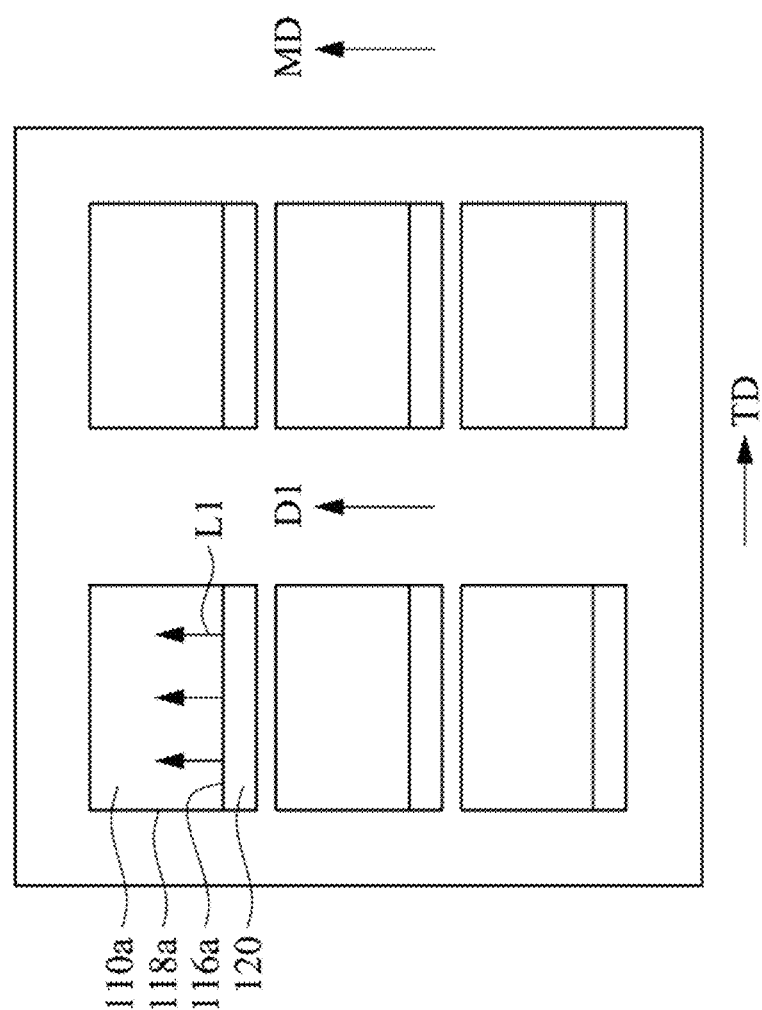

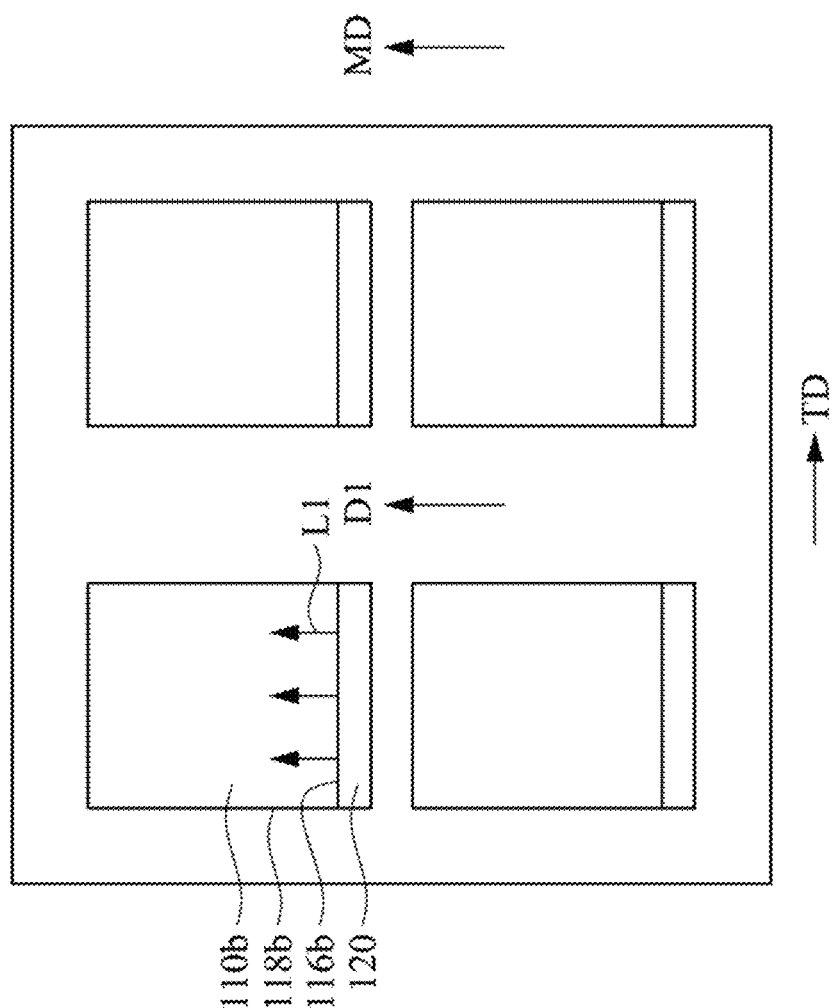

DISPLAY DEVICE AND MOUNTING METHOD OF THE SAME

CROSS-REFERENCE TO RELATED APPLICATION

This application claims priority to Taiwan Application Serial Number 111146486, filed Dec. 5, 2022, which is herein incorporated by reference in its entirety.

BACKGROUND

Field of Invention

The present invention relates to a display device and mounting method of the display device.

Description of Related Art

As the requirement for the thinned and flexible display device increases, thickness of a light guide plate needs to be reduced. However, irregular structures are formed on a surface of the light guide plate during the manufacturing process of the light guide plate. The irregular structures influence the light guiding effect more when the thickness of the light guide plate is thinner. In addition, the dot structures or the micro structures on the light guide plate cannot reduce or eliminate the influence on the light guiding effect from the irregular protrusion structures.

Accordingly, it is still a development direction for the industry to provide a display device that can solve the problems mentioned above.

SUMMARY

The invention provides a display device.

In one embodiment, the display device includes a display panel, a front light module, and a cover structure. The front light module is located on the display panel. The front light module includes a light guide thin film and a light source. The light guide thin film has a thickness. The light guide thin film includes a top surface and an irregular protrusion structure located on the top surface. The irregular protrusion structure has a stripe feature direction in a plan view, and the irregular protrusion structure has a height difference. The light source is configured to emit a light beam traveling in a direction parallel with the stripe feature direction of the irregular protrusion structure. The cover structure is located on the front light module.

In one embodiment, the thickness of the light guide thin film is smaller than 110 micrometers.

In one embodiment, the height difference is smaller than or equal to one tenth of the thickness of the light guide thin film.

In one embodiment, the light source includes a light emitting surface, and a normal direction of the light emitting surface is parallel with the stripe feature direction of the irregular protrusion structure.

In one embodiment, the light source includes a light emitting surface, and a normal direction of the light emitting surface is parallel with a machine direction (MD) of the light guide thin film.

In one embodiment, the light source includes a light emitting surface, the light guide thin film includes a first side surface facing the light emitting surface, and a normal direction of the light emitting surface is parallel with a machine direction of the light guide thin film.

In one embodiment, the light source includes a light emitting surface, the light guide thin film includes a second side surface, and a normal direction of the second side surface is perpendicular to the stripe feature direction of the irregular protrusion structure.

Another aspect of the present disclosure is a mounting method of a display device.

In one embodiment, the mounting method includes disposing a front light module on a display panel and disposing a cover structure on the front light module. Disposing the front light module on the display panel includes providing a light guide thin film on the display panel, determining a stripe feature direction of the irregular protrusion structure in a plan view, and disposing a light source of the front light module based on the stripe feature direction of the irregular protrusion structure. The light guide thin film has a thickness and includes a top surface and an irregular protrusion structure located on the top surface, and the irregular protrusion structure has a height difference.

In one embodiment, determining the stripe feature direction of the irregular protrusion structure further includes inspecting the top surface of the light guide thin film through a laser con-focal microscope.

In one embodiment, determining the stripe feature direction of the irregular protrusion structure further includes inspecting the top surface of the light guide thin film through an optical microscope.

In one embodiment, determining the stripe feature direction of the irregular protrusion structure further includes illuminating a first side of the light guide thin film to form a first ray, illuminating a second side of the light guide thin film to form a second ray, and determining the stripe feature direction of the irregular protrusion structure based on the first ray and the second ray.

In one embodiment, disposing the light source of the front light module based on the stripe feature direction of the irregular protrusion structure further includes making a traveling direction of a light beam emitted by the light source be parallel with the stripe feature direction of the irregular protrusion structure.

In one embodiment, disposing the light source of the front light module based on the stripe feature direction of the irregular protrusion structure further includes making a normal direction of a light emitting surface of the light source be parallel with a machine direction (MD) of the light guide thin film.

In one embodiment, disposing the light source of the front light module based on the stripe feature direction of the irregular protrusion structure further includes making a normal direction of a light emitting surface of the light source parallel with the stripe feature direction of the irregular protrusion structure.

In one embodiment, disposing the light source of the front light module based on the stripe feature direction of the irregular protrusion structure further includes making a normal direction of a light emitting surface of the light source be parallel with a normal direction of a first side surface of the light guide thin film facing the light emitting surface.

In one embodiment, disposing the light source of the front light module based on the stripe feature direction of the irregular protrusion structure further includes making a normal direction of a light emitting surface of the light source be perpendicular with a normal direction of a second side surface of the light guide thin film.

In the aforesaid embodiments, the intense and non-uniform light formed by the irregular protrusion structures that cannot be reduced or eliminated by the dot structures or the micro structures can be reduced by making the traveling direction of the light beam from the light source be parallel with the stripe feature direction of the irregular protrusion structures.

BRIEF DESCRIPTION OF THE DRAWINGS

The invention can be more fully understood by reading the following detailed description of the embodiment, with reference made to the accompanying drawings as follows:

FIGS. 6A to 7B are schematics of intermediate steps of a mounting method of a display device according to one embodiment of the present disclosure; and FIGS. 8A to 8B are schematics of intermediate steps of a mounting method of a display device according to one embodiment of the present disclosure.

DETAILED DESCRIPTION

Figure 1:
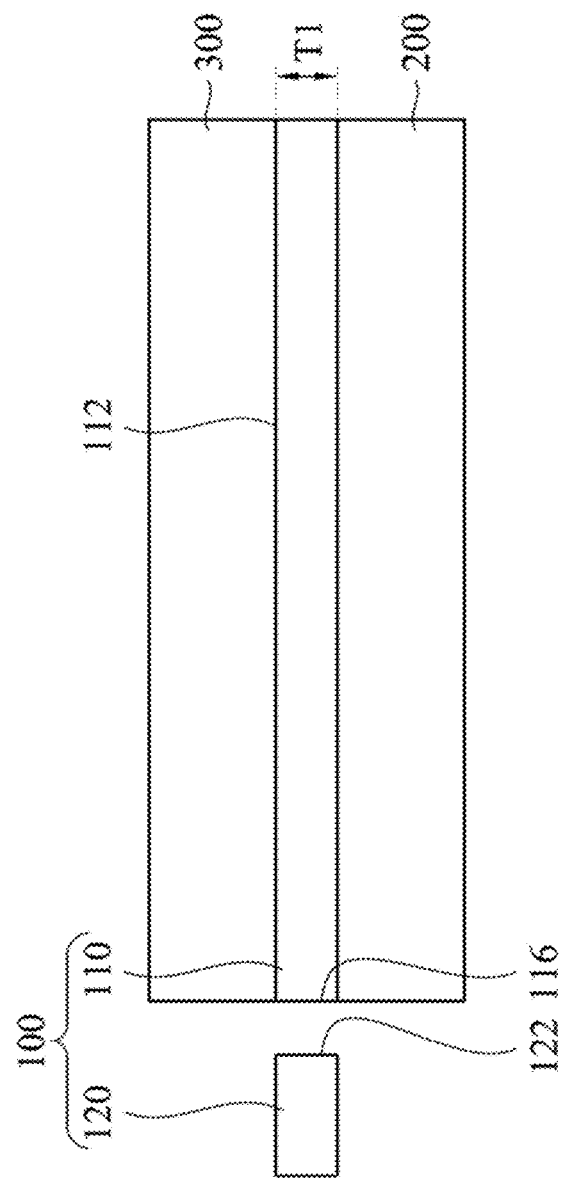
FIG. 1 is a cross-sectional view of a display device according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 is a cross-sectional view of a display device 10 according to one embodiment of the present disclosure. The display device 10 includes a front light module 100, a display panel 200, and a cover structure 300. The front light module 100 is located between the display panel 200 and the cover structure 300. The front light module 100 includes a light guide thin film 110 and a light source 120. The display panel 200 is a reflective display device, such as the Electro-Phoretic Display (EPD). Optical adhesive layers or other functional layers (e.g., touch layer) between the display panel 200 and the front light module 100 and between the front light module 100 and the cover structure 300 are omitted in FIG. 1.

The light guide thin film 110 has a thickness T1. The thickness T1 is smaller than 110 micrometers, but the present disclosure is not limited thereto. In some embodiment, the thickness T1 is greater than 90 micrometers and is smaller than 110 micrometers. The light guide thin film 110 includes a top surface 112 facing the cover structure 300. The light guide thin film 110 is an ultrathin light guide, which is beneficial to reduce the thickness of the display device 10 and to manufacture flexible and thinned display device 10.

The material of the light guide thin film 110 includes Polymethyl Methacrylate (PMMA), Polycarbonate (PC), Polystyrene (PS), or copolymer of PMMA and PS.

Figure 2:
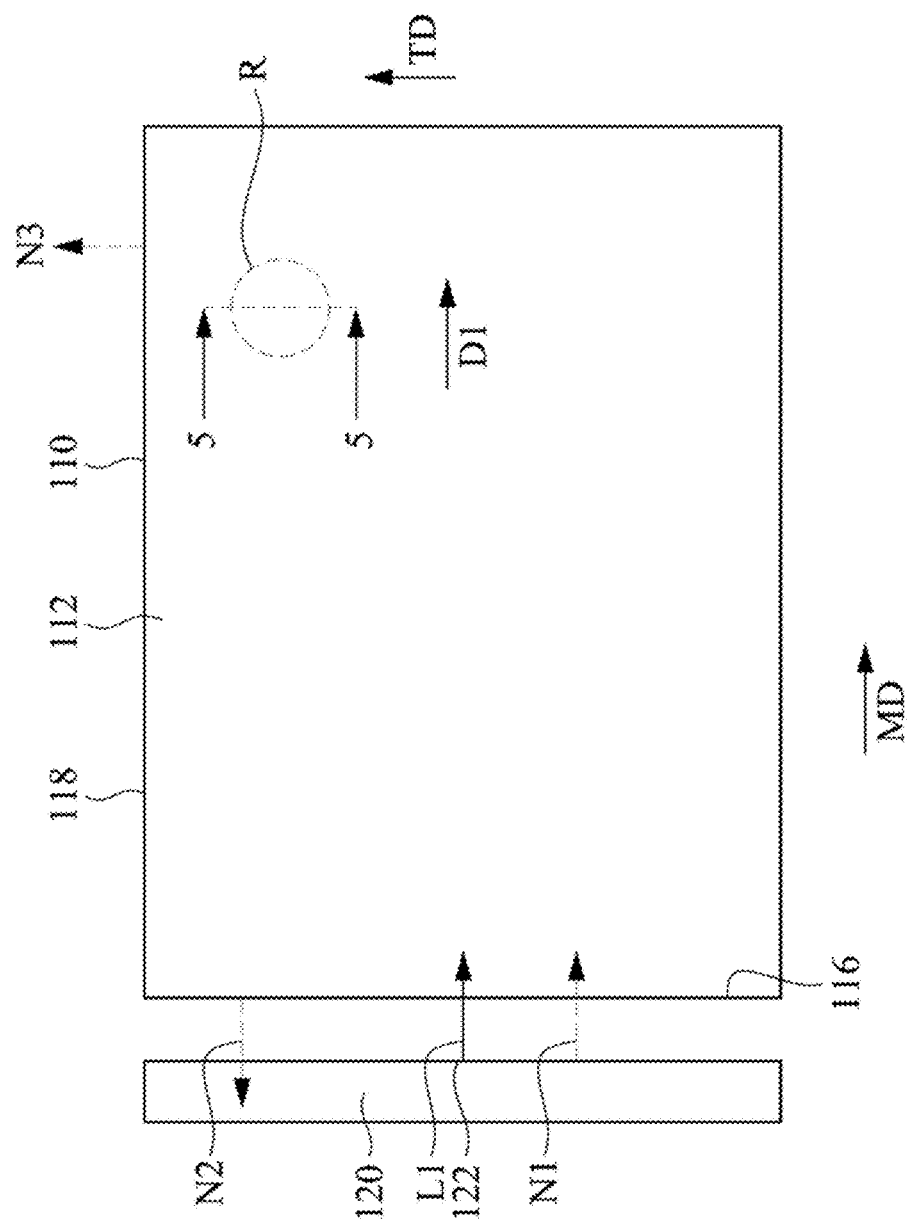
FIG. 2 is a top view of the light guide thin film in FIG. 1.

FIG. 2 is a top view of the light guide thin film 110 in FIG. 1. According to the extension direction of the light guide thin film 110 during the manufacturing process, the light guide thin film 110 has a machine direction MD and a transverse direction TD. The machine direction MD is the direction of producing the light guide thin film 110, and the transverse direction TD is the direction perpendicular to the machine direction MD.

Figure 3:
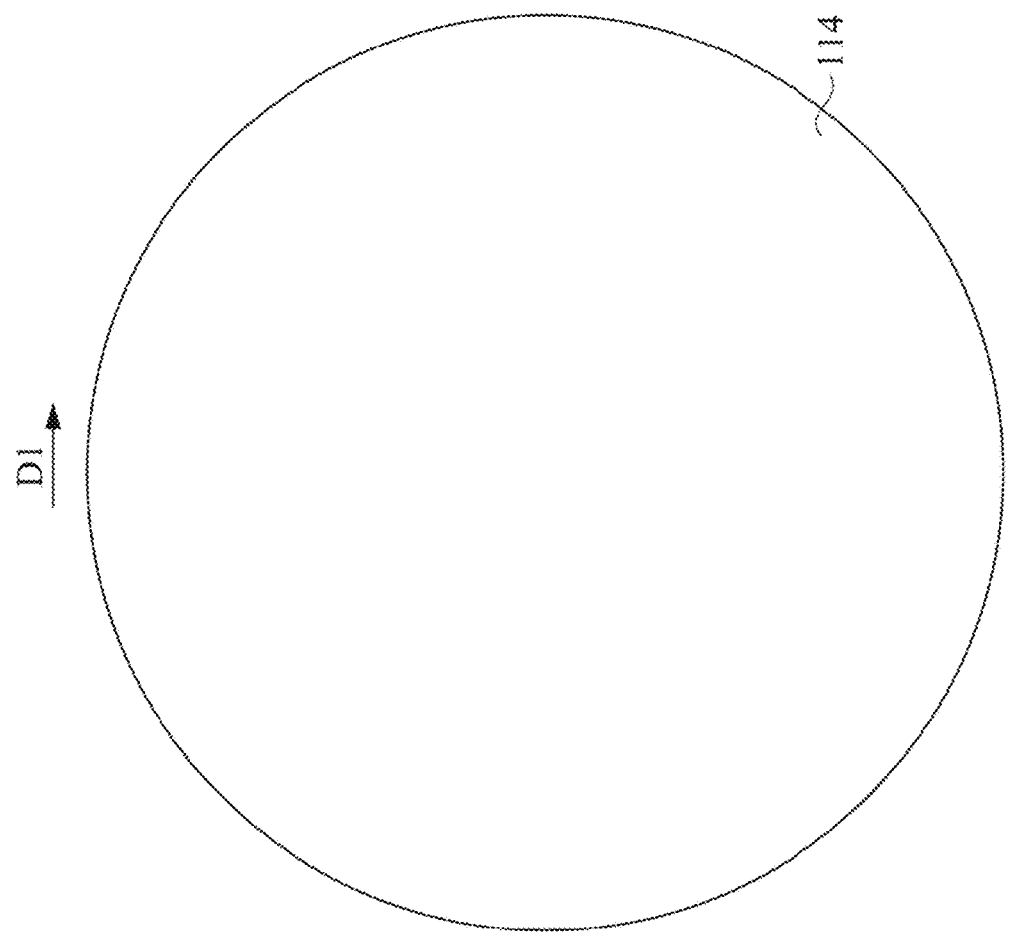
FIG. 3 is an enlarged view of the framed region in FIG. 2.

FIG. 3 is an enlarged view of the framed region R in FIG. 2. FIG. 3 shows an image acquired by a laser con-focal microscope. Reference is made to FIG. 2 and FIG. 3. The light guide thin film 110 includes an irregular protrusion structure 114 located on the top surface 112. The regions with different light and shade in FIG. 3 indicate the protrusion structures with different heights. Since the light guide thin film 110 is an ultrathin light guide whose thickness is smaller than 110 micrometers, the irregular protrusion structure 114 is formed during the manufacturing process of the light guide thin film 110. It can be seen in FIG. 3, the irregular protrusion structure 114 has strip features, and the irregular protrusion structure 114 has a stripe feature direction D1 in a plan view.

Reference is made to FIG. 2 and FIG. 3. The stripe feature direction D1 of the irregular protrusion structure 114 is substantially parallel with the machine direction MD of the light guide thin film 110. In other words, the stripe feature direction D1 of the irregular protrusion structure 114 is substantially perpendicular to the transverse direction TD of the light guide thin film 110. The light source 120 is configured to emit a light beam L1, and a traveling direction of the light beam L1 is parallel with the stripe feature direction D1 of the irregular protrusion structure 114.

Figure 4:
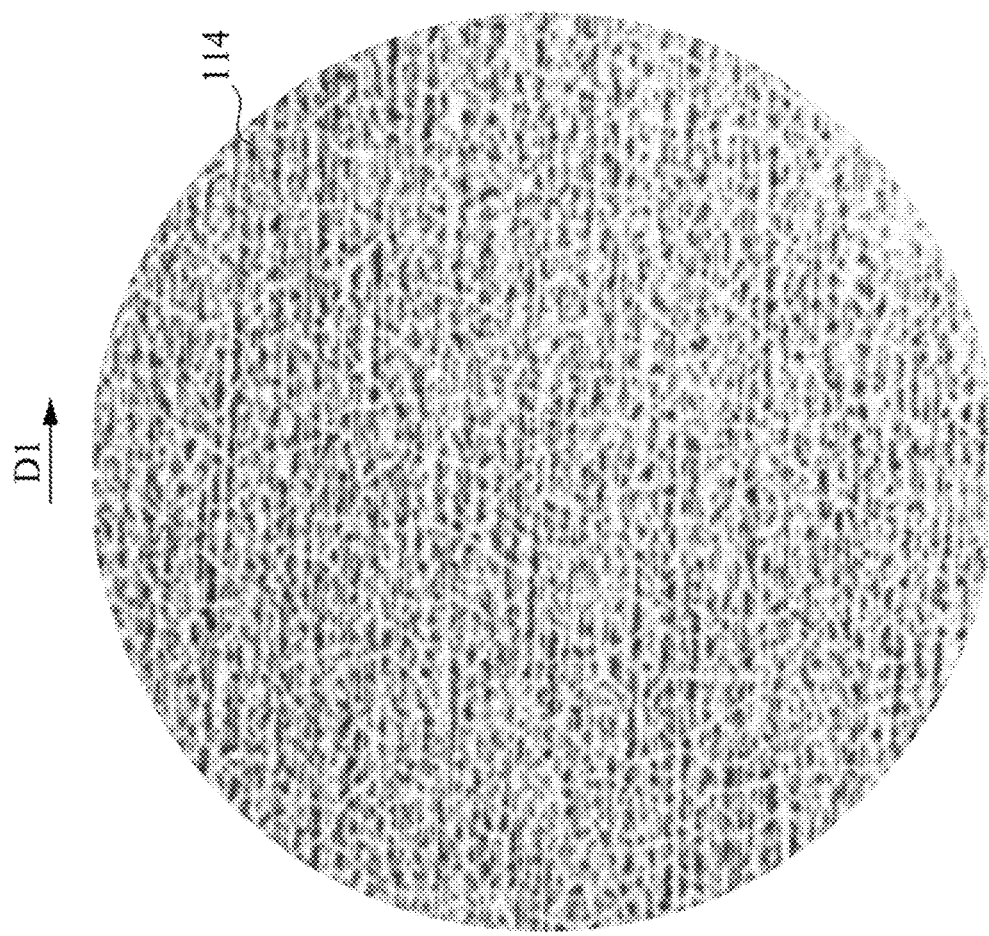
FIG. 4 is an enlarged view of a light guide thin film according to another embodiment of the present disclosure.

FIG. 4 is an enlarged view of a light guide thin film 110 according to another embodiment of the present disclosure. FIG. 4 shows an image of the light guide thin film 110 acquired by an optical microscope with magnification 10×. As shown in FIG. 4, the irregular protrusion structure 114 appears irregular structures having horizontal stripe shapes. The stripe feature direction D1 is substantially parallel with the machine direction MD of the light guide thin film 110.

Figure 5:
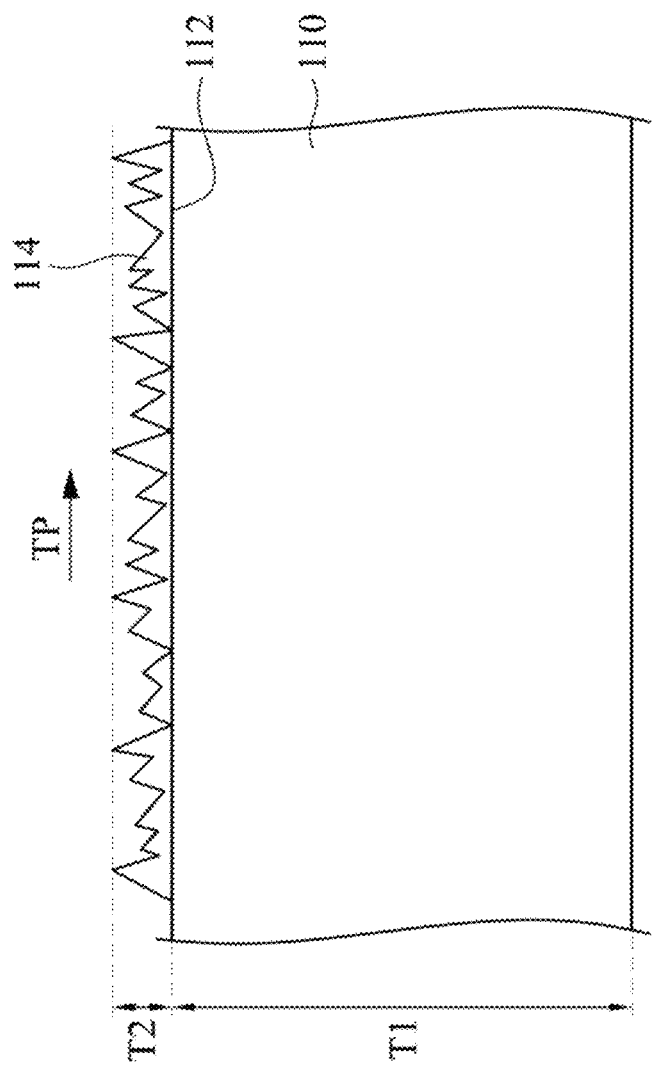
FIG. 5 is a cross-sectional view taken along line 5-5 in FIG. 2.

FIG. 5 is a cross-sectional view taken along line 5-5 in FIG. 2. The irregular protrusion structure 114 protrudes outwardly from the top surface 112. The irregular protrusion structure 114 has a height difference T2 in a cross-sectional view. The height difference T2 is defined as a vertical distance between the highest position of the irregular protrusion structure 114 and the top surface 112. The height difference T2 of the irregular protrusion structure 114 is smaller than 10 micrometers. The height difference T2 of the irregular protrusion structure 114 is smaller than or equal to one-tenth of the thickness T1 of the light guide thin film 110.

In general, light guiding effect of the light guide plate can be enhanced by disposing dot structures or micro structures. However, a range of sizes of the irregular protrusion structures 114 is smaller than a range of sizes of the dot structures or micro structures. For example, a height of the dot structures or the micro structures is in a range about from 20 micrometers to 40 micrometers. Therefore, the irregular protrusion structures 114 has greater influence on the light guiding effect of the light guide thin film 110 when the light guide thin film 110 is an ultrathin light guide plate and the height difference T2 of the irregular protrusion structures 114 is smaller than or equal to one-tenth of the height T1 of the light guide thin film 110. When the light beam L1 from the light source 120 is at least partially or completely perpendicular to the stripe feature direction D1 of the irregular protrusion structures 114, an output light path of the light beam L1 is affected by the irregular protrusion structures 114 and an intense and non-uniform light is formed. In addition, the dot structures or the micro structures on the light guide thin film 110 cannot reduce or eliminate the intense and non-uniform light formed by the irregular protrusion structures 114.

Accordingly, when the height difference T2 of the irregular protrusion structures 114 is smaller than or equal to one-tenth of the thickness T1 of the light guide thin film 110, the intense and non-uniform light formed by the irregular protrusion structures 114 that cannot be reduced or eliminated by the dot structures or the micro structures can be reduced by making the traveling direction of the light beam L1 from the light source 120 be parallel with the stripe feature direction D1 of the irregular protrusion structures 114.

Reference is made to FIG. 1 and FIG. 2. In the present embodiment, the light source 120 is a light bar. The light source 120 has a light emitting surface 122. The light guide thin film 110 has a first side surface 116 facing the light emitting surface 122. The first side surface 116 of the light guide thin film 110 connects the top surface 112. The light source 120 can includes multiple illuminating sources such as multiple light-emitting diodes (LED), but the present disclosure is not limited thereto. A normal direction N1 of the light emitting surface 122 is parallel with the stripe feature direction D1 of the irregular protrusion structures 114. In other words, the normal direction N1 of the light emitting surface 122 is also parallel with the machine direction of the light guide thin film 110. In some embodiments, the normal direction N1 of the light emitting surface 122 is parallel with a normal direction N2 of the first side surface 116. That is, the normal direction N2 of the first side surface 116 is parallel with the machine direction MD of the light guide thin film 110. As such, the light from each of the light-emitting diodes in the light source 120 can collectively travel from the first side surface 116 along the stripe feature direction D1.

The light guide thin film 110 has a second side surface 118. The second side surface 118 of the light guide thin film 110 connects the first side surface 116 and the top surface 112. In the present embodiment, the light source 120 is not disposed at the second side surface 118. Therefore, there is no light beam which is perpendicular to the stripe feature direction D1 enters the light guide thin film 110. A normal direction N3 of the second side surface 118 is perpendicular to the stripe feature direction D1 of the irregular protrusion structures 114. In other words, the normal direction N3 of the second side surface 118 is parallel with the transverse direction TD of the light guide thin film 110. Therefore, the intense and non-uniform light formed by the irregular protrusion structures 114 that cannot be reduced or eliminated by the dot structures or the micro structures can be reduced by making the light beam L1 not entering the light guide thin film 110 from the second side surface 118.

It is to be noted that the connection relationships, materials, and advantages of the elements described above will not be repeated. In the following description, a manufacturing method of the display device 10 will be described.

Reference is made to FIG. 1. The mounting method of the display device 10 includes disposing the front light module 100 on the display panel 200 and disposing the cover structure 300 on the front light module 100.

FIGS. 6A to 6B are schematics of intermediate steps of a mounting method of a display device according to one embodiment of the present disclosure. FIG. 6A is a top view, and FIG. 6B is a cross-sectional view taken along line 6B-6B in FIG. 6A. The step of disposing the front light module 100 on the display panel 200 further includes providing the light guide thin film 110 on the display panel 200, determining the stripe feature direction D1 of the irregular protrusion structure 114 of the light guide thin film 110, and disposing the light source 120 based on the stripe feature direction D1 of the irregular protrusion structure 114 (see FIG. 3). FIG. 6A and FIG. 6B are schematics of the method of determining the stripe feature direction D1 of the irregular protrusion structure 114 of the light guide thin film 110.

The light guide thin film 110 has the first side surface 116, the second side surface 118, a third side surface 117, and a fourth side surface 119. The first side surface 116 is adjacent to the second side surface 118 and the fourth side surface 119. The first side surface 116 opposite the third side surface 117. The first side surface 116 and the third side surface 117 are the two side surfaces along the machine direction MD of the light guide thin film 110. The second side surface 118 and the fourth side surface 119 are the two side surfaces along the transverse direction TD of the light guide thin film 110.

As shown in FIG. 6B, the first side surface 116 of the light guide thin film 110 is illuminated to form a first ray RA1. The light beam L2 is parallel with the stripe feature direction D1 of the irregular protrusion structure 114, and is parallel with the machine direction MD of the light guide thin film 110 as well.

FIGS. 7A to 7B are schematics of intermediate steps of a mounting method of a display device according to one embodiment of the present disclosure. FIG. 7A is a top view, and FIG. 7B is a cross-sectional view taken along line 7B-7B in FIG. 7A. FIG. 7A and FIG. 7B are schematics of the method of determining the stripe feature direction D1 of the irregular protrusion structure 114 (see FIG. 3) of the light guide thin film 110.

As shown in FIG. 7B, the second side surface 118 of the light guide thin film 110 is illuminated to form a second ray RA2. The light L3 is perpendicular to the stripe feature direction D1 of the irregular protrusion structure 114, and is perpendicular to the machine direction MD of the light guide thin film 110 as well.

It can be seen by comparing FIG. 6B and FIG. 7B that the first ray RA1 has low intensity and is uniform, while the second ray RA2 is intense and is non-uniform. Accordingly, when the light beam L2 is parallel with the stripe feature direction D1 of the irregular protrusion structure 114 (see FIG. 3), the light beam L2 is less influenced by the irregular protrusion structure 114. When the light beam L3 is perpendicular to the stripe feature direction D1 of the irregular protrusion structure 114, the light beam L3 is influenced by the irregular protrusion structure 114 more. As described above, the dot structures or the micro structures on the light guide thin film cannot reduce or eliminate the second ray RA2 when the light guide thin film 110 is an ultrathin light guide plate and the height difference T2 of the irregular protrusion structures 114 is smaller than or equal to one-tenth of the height T1 of the light guide thin film 110.

After the aforesaid steps, the stripe feature direction D1 of the irregular protrusion structure 114 can be determined based on the first ray RA1 and the second ray RA2. For example, intensity and uniformity of the first ray RA1 and the second ray RA2 can be measured and compared. It should be noted that, the first side surface 116 and the second side surface 118 are illuminated in this embodiment as an example. In other embodiments, two arbitrary side surfaces can be chosen to be illuminated, as long as the stripe feature direction D1 of the irregular protrusion structure 114 can be determined based on the rays formed after illumination.

Reference is made to FIG. 3. In another embodiment, the method of determining the stripe feature direction D1 of the irregular protrusion structure 114 is inspecting the top surface 112 of the light guide thin film 110 through a laser con-focal microscope. The con-focal microscope can observe a distribution of structures having different heights relative to the top surface 112 so as to know the stripe feature direction D1 of the irregular protrusion structure 114.

Reference is made to FIG. 4. In another embodiment, the method of determining the stripe feature direction D1 of the irregular protrusion structure 114 is inspecting the top surface 112 of the light guide thin film 110 through an optical microscope.

FIGS. 8A to 8B are schematics of intermediate steps of a mounting method of a display device according to one embodiment of the present disclosure. The light source 120 is attached based on the stripe feature direction D1 of the irregular protrusion structure 114 (see FIG. 3) such that the traveling direction of the light beam L1 emitted by the light source 120 is parallel with the stripe feature direction D1 of the irregular protrusion structure 114. In the present embodiment, the first side surface 116a of the light guide thin film 110a corresponds to a long edge of the light guide thin film 110a, and the second side surface 118a corresponds to a short edge of the light guide thin film 110a. The light source 120 is attached to the first side surface 116a of the light guide thin film 110a based on the stripe feature direction D1. Lastly, the cover structure 300 shown in FIG. 1 is attached onto the front light module 100a. Therefore, the light source 120 is located at the long edge of the display device in the present embodiment.

FIG. 8B is schematics of intermediate steps of a mounting method of a display device according to one embodiment of the present disclosure. In the present embodiment, the first side surface 116b of the light guide thin film 110b corresponds to a short edge of the light guide thin film 110b, and the second side surface 118b corresponds to a long edge of the light guide thin film 110b. The light source 120 is attached to the first side surface 116b of the light guide thin film 110b based on the stripe feature direction D1. Lastly, the cover structure 300 shown in FIG. 1 is attached onto the front light module 100b. Therefore, the light source 120 is located at the short edge of the display device in the present embodiment.

In summary, when the height difference of the irregular protrusion structures is smaller than or equal to one-tenth of the thickness of the light guide thin film, the intense and non-uniform light formed by the irregular protrusion structures that cannot be reduced or eliminated by the dot structures or the micro structures can be reduced by making the traveling direction of the light beam from the light source be parallel with the stripe feature direction of the irregular protrusion structures.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device, comprising:
a display panel;
a front light module located on the display panel, wherein the front light module comprises:
a light guide thin film having a thickness smaller than 110 micrometers, wherein the light guide thin film comprises a top surface and an irregular protrusion structure located on the top surface, the irregular protrusion structure has a stripe feature direction in a plan view, and the irregular protrusion structure has a height difference smaller than or equal to one-tenth of the thickness of the light guide thin film; and
a light source configured to emit a light beam traveling in a direction parallel with the stripe feature direction of the irregular protrusion structure, wherein the light source comprises a light emitting surface, and a normal direction of the light emitting surface is parallel with the stripe feature direction of the irregular protrusion structure; and
a cover structure located on the front light module.

2. The display device of claim 1, wherein the light source comprises a light emitting surface, and a normal direction of the light emitting surface is parallel with a machine direction (MD) of the light guide thin film.

3. The display device of claim 1, wherein the light source comprises a light emitting surface, the light guide thin film comprises a first side surface facing the light emitting surface, and a normal direction of the light emitting surface is parallel with a machine direction of the light guide thin film.

4. The display device of claim 1, wherein the light source comprises a light emitting surface, the light guide thin film comprises a second side surface, and a normal direction of the second side surface is perpendicular to the stripe feature direction of the irregular protrusion structure.

5. A mounting method of a display device, comprising:
disposing a front light module on a display panel, comprising:
providing a light guide thin film on the display panel, wherein the light guide thin film has a thickness and comprises a top surface and an irregular protrusion structure located on the top surface, and the irregular protrusion structure has a height difference;
determining a stripe feature direction of the irregular protrusion structure in a plan view, comprising:
illuminating a first side of the light guide thin film to form a first ray:
illuminating a second side of the light guide thin film to form a second ray; and
determining the stripe feature direction of the irregular protrusion structure based on the first ray and the second ray; and
disposing a light source of the front light module based on the stripe feature direction of the irregular protrusion structure; and
disposing a cover structure on the front light module.

6. The mounting method of the display device of claim 5, wherein determining the stripe feature direction of the irregular protrusion structure further comprises:
inspecting the top surface of the light guide thin film through a laser con-focal microscope.

7. The mounting method of the display device of claim 5, wherein determining the stripe feature direction of the irregular protrusion structure further comprises:
inspecting the top surface of the light guide thin film through an optical microscope.

8. The mounting method of the display device of claim 5, wherein disposing the light source of the front light module based on the stripe feature direction of the irregular protrusion structure further comprises:

making a traveling direction of a light beam emitted by the light source be parallel with the stripe feature direction of the irregular protrusion structure.

9. The mounting method of the display device of claim 5, wherein disposing the light source of the front light module based on the stripe feature direction of the irregular protrusion structure further comprises:

making a normal direction of a light emitting surface of the light source parallel with a machine direction (MD) of the light guide thin film.

10. The mounting method of the display device of claim 5, wherein disposing the light source of the front light module based on the stripe feature direction of the irregular protrusion structure further comprises:

making a normal direction of a light emitting surface of the light source be parallel with the stripe feature direction of the irregular protrusion structure.

11. The mounting method of the display device of claim 5, wherein disposing the light source of the front light module based on the stripe feature direction of the irregular protrusion structure further comprises:

making a normal direction of a light emitting surface of the light source be parallel with a normal direction of a first side surface of the light guide thin film facing the light emitting surface.

12. The mounting method of the display device of claim 5, wherein disposing the light source of the front light module based on the stripe feature direction of the irregular protrusion structure further comprises:

making a normal direction of a light emitting surface of the light source be perpendicular with a normal direction of a second side surface of the light guide thin film.

\* \* \* \* \*